Figure 1:
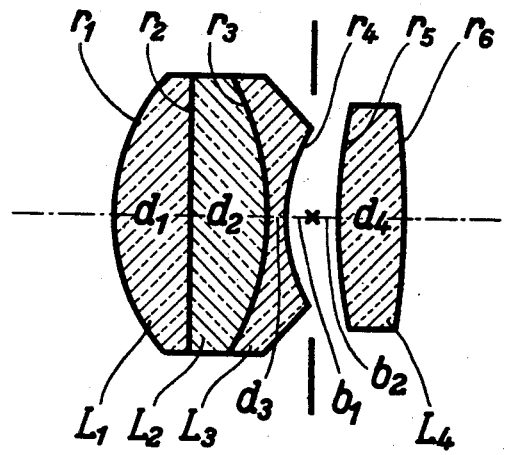

July 19, 1938.  S. HUBER  2,124,301
PHOTOGRAPHIC OBJECTIVE
Filed Nov. 6, 1936  2 Sheets-Sheet 1

(—) (+)

$r_1 = + 30.63$
$r_2 = \infty$
$r_3 = - 39.93$
$r_4 = + 25.07$ $r_5 = + 76.74$
$r_6 = - 112.77$ $d_1 = 11.47$
$d_2 = 11.49$
$d_3 = 2.88$
$b_1 = 3.77$
$b_2 = 4.00$
$d_4 = 9.86$

|        | $L_1$    | $L_2$    | $L_3$    | $L_4$    |
|--------|----------|----------|----------|----------|
| $n_D$ =| 1.67224  | 1.49303  | 1.72138  | 1.75806  |
| $\nu$ =| 47.0     | 66.0     | 29.3     | 27.4     |

Inventor:
Sylvester Huber

July 19, 1938.  S. HUBER  2,124,301
PHOTOGRAPHIC OBJECTIVE
Filed Nov. 6, 1936   2 Sheets-Sheet 2

$r_1 = +30.14$
$r_2 = \infty$
$r_3 = -37.06$
$r_4 = +24.31$ $r_5 = -187.30$
$r_6 = +29.59$
$r_7 = -57.34$ $d_1 = 7.06$
$d_2 = 6.26$
$d_3 = 3.06$
$b_1 = 3.33$
$b_2 = 3.06$
$d_4 = 2.40$
$d_5 = 7.33$

|  | $L_1$ | $L_2$ | $L_3$ | $L_4$ | $L_5$ |
|---|---|---|---|---|---|
| $n_D =$ | 1.67224 | 1.46711 | 1.61624 | 1.53332 | 1.67224 |
| $\nu =$ | 47.0 | 65.6 | 36.7 | 48.9 | 47.0 |

Inventor:
Sylvester Huber

Patented July 19, 1938

2,124,301

UNITED STATES PATENT OFFICE 2,124,301

PHOTOGRAPHIC OBJECTIVE

Sylvester Huber, Jena, Germany, assignor to the firm of Carl Zeiss, Jena, Germany Application November 6, 1936, Serial No. 109,508
In Germany November 15, 1935

2 Claims. (Cl. 88—57)

Application has been filed in Germany, November 15, 1935.

The invention concerns an objective for photographic and projection purposes consisting of two members, the one member being a three-lens meniscus the concave side of which faces the other member and the two exterior lenses of which have refractive powers reverse to each other and include a refracting medium whose refractive index is greater than 1 and smaller than the refractive indices of the adjacent mediums, and the other member being convergent and having a focal length smaller than the total focal length of the objective. Objectives of this kind, in some of which the three-lens member faces, and in some others of which this member is remote from, the object to be photographed, are very advantageous in that they have only few surfaces bounded by air and in that, accordingly, the quantity of the images produced on these surfaces on account of double reflection is negligible. The photograph of an object in which the values of brightness are very different will therefore turn out very fogless. The apertures of the known objectives of the said kind are to be, however, comparatively small if the imaging errors, especially spherical aberration, image curvature and astigmatism, are desired to be eliminated to an extent satisfying photographic conditions.

The invention considerably increases the luminous intensity and provides an anastigmatically plane image field by making the sum of the radii of the first and last refractive surfaces of these objectives, numerically, greater than two thirds of the focal length of the objective, the imaging errors of wide-angled pencils being thus largely eliminated.

With a view to providing favourable conditions of curvature for the refractive surfaces of the objectives according to the invention, it is convenient to use as a refractive surface next but one to the object to be photographed a surface having a radius of curvature which is, numerically, at least one and a half times as great as the radius of curvature of the surface next to the said object.

Figure 2:
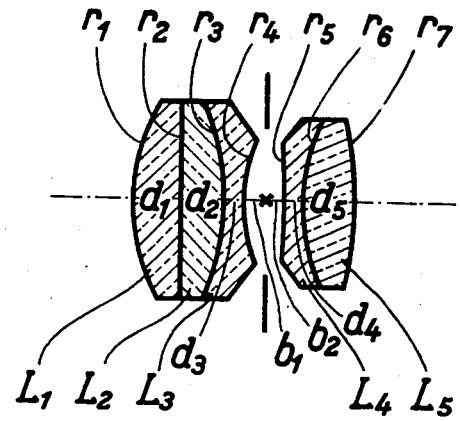

In the accompanying drawings Figures 1 and 2 illustrate in sections containing the optical axes two different objectives according to the invention.

The objective according to Figure 1 consists of a meniscus having three cemented lenses $L_1$, $L_2$ and $L_3$ and a single convergent bi-convex lens $L_4$ separated from the meniscus by air and faced by the convergent lens of this meniscus. The locus of a diaphragm is between the meniscus and the convergent lens, the axial distances of this locus from those surfaces of the meniscus and the convergent lens which face each other being $b_1$ and $b_2$.

The objective according to Figure 2 comprises a meniscus consisting of three cemented lenses $L_1$, $L_2$ and $L_3$ and a meniscus consisting of two cemented lenses $L_4$ and $L_5$. These menisci are separated by air, and their concave sides face each other. The locus of a diaphragm is between the two menisci, the axial distances of this locus from those surfaces of these said menisci which face each other being $b_1$ and $b_2$.

The constructional data of the two examples shown in the drawings and the kinds of glass to be used are stated in the following tables, the figures being in millimeters and referring to focal length of the objectives of 100 millimeters.

*First constructional example (Figure 1)*

| Radii | Thicknesses and distances | Kinds of glass | |
|---|---|---|---|
| | | $n_D$ | $\gamma$ |
| $r_1 = +30.63$ | | | |
| | $d_1 = 11.47$ | 1.67224 | 47.0 |
| $r_2 = \infty$ | | | |
| | $d_2 = 11.49$ | 1.49303 | 66.0 |
| $r_3 = -39.93$ | | | |
| | $d_3 = 2.88$ | 1.72138 | 29.3 |
| $r_4 = +25.07$ | | | |
| | $b_1 = 3.77$ | | |
| | $b_2 = 4.00$ | | |
| $r_5 = +76.74$ | | | |
| | $d_4 = 9.86$ | 1.75806 | 27.4 |
| $r_6 = -112.77$ | | | |

The greatest ratio of lens aperture for this objective is 1:2.8.

*Second constructional example (Figure 2)*

| Radii | Thicknesses and distances | Kinds of glass | |
|---|---|---|---|
| | | $n_D$ | $\gamma$ |
| $r_1 = +30.14$ | | | |
| | $d_1 = 7.06$ | 1.67224 | 47.0 |
| $r_2 = \infty$ | | | |
| | $d_2 = 6.26$ | 1.46711 | 65.6 |
| $r_3 = -37.06$ | | | |
| | $d_3 = 3.06$ | 1.61624 | 36.7 |
| $r_4 = +24.31$ | | | |
| | $b_1 = 3.33$ | | |
| $r_5 = -187.30$ | $b_2 = 3.06$ | | |
| | $d_4 = 2.40$ | 1.53332 | 48.9 |
| $r_6 = +29.59$ | | | |
| | $d_5 = 7.33$ | 1.67224 | 47.0 |
| $r_7 = -57.34$ | | | |

The greatest ratio of lens aperture for this objective is 1:3.5.

I claim:

1. A photographic objective, consisting of two members in axial alignment separated by air, the one member being a three-lens meniscus the concave side of which faces the other member, this other member being convergent, the exterior lenses of the meniscus having reverse refractive powers and including a lens of refractive medium which has a refractive index greater than 1 and smaller than the refractive indices of the surrounding lens mediums, the focal length of the said convergent member being smaller than the total focal length of the objective, and the sum of the radii of the first and last refractive surfaces of the objective being, numerically, greater than two-thirds of the focal length of the objective, the radius of the exterior surface toward the object of the three-lens meniscus being, numerically, smaller than the radius of the exterior surface toward the image of the said convergent member and greater than one fifth of the focal length of the objective.

2. A photographic objective, consisting of two members in axial alignment separated by air, the one member being a three-lens meniscus the concave side of which faces the other member, this other member being convergent, the exterior lenses of the meniscus having reverse refractive powers and including a lens of refractive medium which has a refractive index greater than 1 and smaller than the refractive indices of the surrounding lens mediums, the focal length of the said convergent member being smaller than the total focal length of the objective, the sum of the radii of the first and last refractive surfaces of the objective being, numerically, greater than two-thirds of the focal length of the objective, the radius of the exterior surface toward the object of the three-lens meniscus being, numerically, smaller than the radius of the exterior surface toward the image of the said convergent member and greater than one fifth of the focal length of the objective, and the radius of curvature of that refractive surface of the objective which is next but one to the object when a photograph is taken being, numerically, at least one and a half times as great as the radius of curvature of the surface next to the object.

SYLVESTER HUBER.